United States Patent [19]
Barthe et al.

[11] Patent Number: 5,813,223
[45] Date of Patent: Sep. 29, 1998

[54] PROCESS FOR THE FILTRATION AND COMBUSTION OF CARBONACEOUS MATTER EMERGING FROM INTERNAL COMBUSTION ENGINES

[75] Inventors: Philippe Barthe, Saint Martin du Terre; Jacques Lemaire, Osny; Dennis Petta, Lyons, all of France

[73] Assignee: Rhone-Poulenc Chimie, Courbevoie Cedex, France

[21] Appl. No.: 505,251
[22] PCT Filed: Dec. 30, 1994
[86] PCT No.: PCT/FR94/01560
§ 371 Date: Aug. 16, 1995
§ 102(e) Date: Aug. 16, 1995
[87] PCT Pub. No.: WO95/18198
PCT Pub. Date: Jul. 6, 1995

[30] Foreign Application Priority Data

| Dec. 31, 1993 | [FR] | France | 93 15985 |
| Apr. 20, 1994 | [FR] | France | 94 04713 |
| May 25, 1994 | [FR] | France | 94 06310 |
| May 25, 1994 | [FR] | France | 94 06311 |

[51] Int. Cl.⁶ .................................................. F01N 3/20
[52] U.S. Cl. ................................... 60/274; 60/295
[58] Field of Search ......................... 60/295, 274

[56] References Cited

U.S. PATENT DOCUMENTS

| 3,370,419 | 2/1968 | Ketzer | 60/295 |
| 4,462,208 | 7/1984 | Hicks | 60/288 |
| 4,596,277 | 6/1986 | Djordjevic | 60/295 |
| 4,655,037 | 4/1987 | Rao | 60/295 |
| 4,693,078 | 9/1987 | Dettling | 60/295 |
| 5,386,690 | 2/1995 | Shustorovich | 60/295 |

FOREIGN PATENT DOCUMENTS

| 725371 | 1/1966 | Canada | 60/295 |

*Primary Examiner*—Thomas E. Denion
*Attorney, Agent, or Firm*—Burns, Doane, Swecker & Mathis, L.L.P.

[57] ABSTRACT

The object of the invention is a filtration and combustion process for carbon particulate matter from an internal combustion engine. The process is characterized by the following steps: a rare earth or rare earth mixture derivative is introduced into the fuel at a concentration of 10 ppm to 500 ppm (by weight), and preferably of 20 ppm to 200 ppm; the soot produced by the internal combustion engine is collected on a filter, the temperature of the gases entering the filter being selected in the range of 100° C. to 350° C.; the soot is allowed to build up until a significant fraction or rate of incoming soot is balanced by the combustion of soot in the soot cake on the filter, and no is effected as long as the head loss caused by the soot does not exceed a preselected value and is not higher than 400 millibars. This invention is useful for organic synthesis.

25 Claims, No Drawings

PROCESS FOR THE FILTRATION AND COMBUSTION OF CARBONACEOUS MATTER EMERGING FROM INTERNAL COMBUSTION ENGINES

BACKGROUND OF THE INVENTION

1. Technical Field of the Invention

The subject of the present invention is a process for the filtration and combustion of carbonaceous matter emerging from internal combustion engines. The invention more particularly relates to the regulation of the pressure drop occasioned in filters by the accumulation of soot in the filters.

2. Description of the Prior Art

During the combustion of motor fuels in internal combustion engines and especially during that of diesel oil in diesel engines, carbonaceous matter, hereinafter known as "soot", is formed which is supposed to be harmful both to the health of higher mammals and to the environment.

This soot is particularly abundant in the case of diesel engines and constitutes a handicap for this type of engine. The majority of the solutions envisaged consisting in changing the speed of the engine or its operating parameters come up against another constraint, that of not increasing the emission of carbon monoxide and/or of gases which are supposed to be toxic and mutagenic, such as nitrogen oxides.

Taking into account the above, the most effective technique seems to be to fit the exhaust silencer with a filter which is capable of stopping all, or at the very least most of, the soot formed by the combustion of the various fuels.

Success has thus been achieved in producing filters, especially made of cordierite, which make it possible to reduce soot emissions by at least 85% by mass.

The problem to be solved lies in the accumulation of this soot in the filters which causes, in the first place, an increase in the pressure drop and, in the second place, blocking to begin which leads to a fall in efficiency of the internal combustion engine.

Many a time have combustion techniques of the above soot been tested. It has thus been proposed to cause combustion of this soot intermittently either by electric heating or by heating by means of a fossil igniter fuel. The possibility has also been envisaged of drawing off the heat necessary for igniting this soot from the engine itself, by skillful management of the gas flows so as to heat the soot accumulated in the filter and ipso facto to cause its ignition (temperature of the order of 500°–600° C).

It has also been proposed to introduce ignition catalyst precursors into the various motor fuels, so as to lower the ignition temperature of the soot. These techniques, especially that of combining increasing the temperature of the soot using a suitable and transitory circuit of the exhaust gases with the addition of oxidation catalyst precursors, have made it possible at least partially to solve the problem.

However, on the one hand, the ignition temperature of the soot remains relatively high (of the order of 500° C.) and, on the other hand, there is the risk of the intermittent and violent combustions causing a significant detrimental change in the filter and in its filtering abilities, either by cracking due to thermal shock or even by melting.

This detrimental change in the filters can take the form of a loss in ability to retain a high percentage of soot, while the initial percentage is sometimes considered to be insufficient.

SUMMARY OF THE INVENTION

For the above reason one of the aims of the present invention is to provide a combustion process of the soot which is as continuous as possible.

Another aim of the present invention is to provide a combustion process of the soot which does not produce violent, fierce and sudden ignitions leading to damaging of the filter. In order to achieve such a result, it is advisable to prevent, during the ignition phase, the temperature from reaching 1000° C., advantageously 900° C. and preferably 700° C. in any part of the filter.

As it is difficult to measure the local temperatures, it was laid down that these latter restrictions corresponded to maximum gas temperatures, at the outlet of the filter, of not more than approximately 600° C. ("approximately" in this instance means that zeros, which are in this instance positional zeros, are not significant figures), preferably to approximately 500° C.

Another aim of the present invention is to provide a process for the filtration and combustion of soot which makes it possible to improve the proportion of soot retained on the filters and then subsequently burnt.

DETAILED DESCRIPTION OF BEST MODE AND PREFERRED EMBODIMENT OF THE INVENTION

These aims, and others which will subsequently appear, are achieved by means of a process for the treatment of soot containing one or a number of rare-earth metals, in which process the said soot is brought into contact with a gas containing oxygen at a temperature of between 100° C. and 400° C., advantageously between 150° C. and 350° C. and preferably between 200° C and 300°C., the oxygen partial pressure of the gas containing oxygen being at least equal to 3% of atmosphere, i.e. $3 \times 10^3$ pascals, and advantageously to 4% of atmosphere, i.e. $4 \times 10^3$ pascals.

It is even desirable for the oxygen partial pressure to be at least equal to $6 \times 10^3$ pascals and preferably to 8 kilopascals.

It is also desirable for the contact between the gas containing oxygen and the soot to be maintained for a time interval which is sufficient to burn at least 90% of the soot.

Indeed, in a completely unforeseen way, it was found that rare-earth metals and especially rare-earth metal oxides, especially those of cerium, catalysed oxidation of carbonaceous matter at temperatures as low as 100° C. (this value is in fact a rounded value and it has even been possible to record an oxidation at temperatures of the order of 80° C.).

This phenomenon only occurs when the oxygen content of the gas is sufficiently high. The threshold beyond which oxidation of the soot takes place depends, to a certain extent, on the value of the other parameters. It increases when the rare-earth metal content of the soot decreases and/or when the temperature approaches values towards the lower end of the ranges mentioned above.

It should be noted that, during the preceding tests, this regeneration could not be observed because the oxygen content of the exhaust gases is, under the usual test conditions for such a process, chosen so as to maximize the soot and is much less than that required for this oxidation, which can be described as gentle.

The process according to the invention can be used in many ways for reducing emissions of solid carbonaceous discharge from all sooty combustions and especially from internal combustion engines.

It is thus possible to distinguish continuous operations from those which are intermittent.

In the latter case, if the oxidation of the carbonaceous matter takes place as soon as the combined soot and gas is at the appropriate temperature, it is preferable for the oxygen partial pressure and temperature to be maintained for a sufficiently long period of time in order to oxidize all the soot produced in order to prevent the latter from accumulating or from being discharged. Thus, on average or statistically or continuously, it is advisable that, for a defined period of time, the sum of the time intervals where the conditions of the present invention are combined is sufficient for the soot produced during the defined period of time to be completely oxidized.

The restriction imposed on the system for producing and purifying soot depends on the said defined period of time. In the case where, as in particle filters, the residence time is high, or even infinite, with respect to their life expectancy, it is possible to provide long defined periods of time. The defined period of time can then reach 10 minutes or indeed ½ hour.

In the cases of filter-equipped internal combustion engines, a long defined period of time is paid for by periods during which the pressure drop occasioned by the filter can be relatively high. However, the accumulation of particles in the filters improves the quality of filtration. There is therefore a compromise to be found.

Thus, it is therefore preferable to choose a defined period of time which prevents the carbonaceous particles from causing a pressure drop greater than approximately half an atmosphere. More precisely, desirably ⅖ atmosphere (i.e. $⅖×10^5$ pascals), advantageously of greater than ¼ of atmosphere (i.e. $¼×10^5$ pascals), preferably of greater than ⅕ atmosphere $0.2×10^5$ pascals and, if it is not desired to improve the filtration characteristics of the soot, more preferentially 0.15 atmosphere (i.e.$0.15×10^5$ pascals.

According to an implementation of the present invention, it is possible to vary the parameters of the engine and the optional introduction of a gas containing oxygen so that the temperature and oxygen content constraints are fulfilled so that, during a so-called "European" cycle (EEC standard), there is no accumulation of soot in the filter.

It is also possible to subject the implementation of the process according to the present invention to a pressure drop limit value.

The time interval necessary for gentle oxidation of a given amount of carbonaceous matter obviously decreases with the temperature and oxygen content. This gives a degree of freedom in the implementations of the present invention.

The present invention makes it possible to envisage the use of systems which are less constraining than the particle filter. It is possible especially to envisage systems having the characteristic of cyclones or any system which makes it possible to increase the duration of the residence time in an atmosphere where the conditions necessary for the implementation of this catalytic system prevail.

Under these conditions, if it is desired to remove the soot emitted by the combustion systems, the said defined period of time is at most equal to the residence time of the particles in the space where the conditions according to the present invention prevail constantly or intermittently.

It is thus possible to envisage a number of implementations of the present invention.

According to one of the implementations of the present invention, it is possible to use a filter which collects the soot produced by the combustion engine, while, if the need arises, boosts of air, enriching the exhaust gases with oxygen, make it possible, from time to time, at least partially to regenerate the filter.

This enriching of the exhaust gases with oxygen, in order to reach a value where the process according to the present invention is implemented, is not necessary for all the operating modes of the engine and can be obtained by any means.

It can especially be enriched by the injection of air into the exhaust gas flow. This air can advantageously be heated by bringing into contact with various heat sources and especially with hot components of the engine, directly or via a heat exchanger. The use can also be envisaged of heat reserves which will be heated during the period of non-regeneration of the filter by the exhaust gases and which would restore the stored heat to the air which is charged with enriching the exhaust gases with oxygen during the periods of use of the process according to the present invention.

In certain cases, simply mixing the external air with the exhaust gases makes it possible to obtain a temperature and an oxygen content which is sufficient to be placed in the region where catalytic oxidation takes place under good conditions.

The conditions which prevail in the turbo of a diesel engine are sufficient for combustion to be obtained of the carbonaceous particles which, in general, contaminate the turbo of turbo engines. Indeed, in an entirely unforeseen way, it was shown that the addition of cerium, or of any other rare-earth metal, made it possible to avoid any carbonaceous deposition in the components of the turbo, thus facilitating their operation and their running, even though the temperature conditions which prevail in the turbo are very much lower than those which make it possible to ignite soot, even soot doped with rare-earth metal.

The preferred rare-earth metals are cerium, neodymium and lanthanum.

They can be used alone or as a mixture with potentiating elements, including with other rare-earth metals. Reference may be made, mutatis mutandis, to the part of the description directed more particularly at lanthanum.

However, to date, the best results are those obtained by means of cerium and lanthanum, alone or in combination with other rare-earth metals.

In their catalytic function, these metals are preferably in the form of their IV oxide, in the case of cerium (and, for the sake of regularity, for praseodymium, but this is rather uneconomic), or of trivalent oxide in the other cases.

It is possible to use mixtures of rare-earth metals but, in this case, it is preferable for cerium and/or lanthanum to be in the majority.

It is also possible to use mixtures of rare-earth metals of the above type doped with non-rare-earth metal elements (cf. part on the doping of lanthanum, which part is transposable for any rare-earth metal or mixture of rare-earth metals).

The rare-earth metals can be introduced into the soot by introduction into the motor fuel of a derivative such as their salts or of their sols.

The introduction of compounds based on rare-earth metal (s) can be carried out especially by introduction of compounds based on rare-earth metal(s) into the motor fuel intended to be introduced into the engine.

Another possibility consists in introducing the rare-earth metal(s) in various forms via air, and especially air when it is mixed with exhaust gases of the engine, when a fraction of the exhaust gases is recycled into the engine. In this case, the rare-earth metal(s) compounds incorporated in the recycled soot are introduced into the engine.

However, it should be emphasized that the form under which the rare-earth metal(s) is/are introduced into the fuel is not without effect on the size of the crystallites and aggregates which are found in the soot, a size which plays a role in the catalytic ability of the rare-earth metals present in the soot (cf. French Patent Application No. 92/14158, filed on 25.11.1992 and entitled "Ceric oxide crystallite aggregate, process of production and its use in reducing combustion residues").

Moreover, the lifetime of cerium salts and sols in organic medium is often low and can be the cause of poor results in the catalytic effect. Also, when it is desired to use cerium, it is preferable to use either the sols or the salts which are the subject of European Patent Application filed under No. 93/304760.7 and published under No. 0,575,189. The addition to the motor fuel of the non-stable compounds at the time of use makes it possible at least partly to overcome the difficulties related to the non-stability (case of non-stabilized cerium(III) salts).

Advantageously, the amount of rare-earth metals introduced into the engine is determined so that the rare-earth metal(s) content (by mass of metal contained) in the soot reaches a level of between 1000 ppm and 30%, advantageously at least 5000 ppm and preferably at least 5% and advantageously at most 25% and preferably at most 10%.

On average, during a European cycle, a satisfactory value is of the order of 5 to 10%.

However, it should be emphasized that the form under which the rare-earth metal(s) is/are introduced into the fuel is not without effect on the size of the crystallites and aggregates which are found in the soot, a size which plays a role in the catalytic ability of the rare-earth metals present in the soot (cf. French Patent Application No. 92/14158, filed on 25.11.1992 and entitled "Ceric oxide crystallite aggregate, process of production and its use in reducing combustion residues"). In contrast to what could have been initially believed, this teaching is valid not for cerium alone but for all the rare-earth metals, alone or as a mixture, doped or undoped, and not as solely restricted to cerium. Thus, in the passage which follows and which relates to aggregates and to cerium (ceric) oxide crystallites of which they are composed, cerium oxide plays the role of paradigm (in the same way that the verb "aimer" is the paradigm of the first French conjugation or that "dominus" is the paradigm of the second Latin declination) of rare-earth metal oxides.

Thus, it is preferable to see to it that ceric oxide crystallite aggregates are used directly or indirectly, in which aggregates the largest size is between 20 Å (2 nanometers) and 10,000 Å (1000 nanometers) and preferably between 50 Å (5 nanometers) and 5000 Å (500 nanometers) and where the size of the crystallites, measured for the (1,1,1) plane by the Debye and Scherrer technique, is between 20 and 250 Å (2 to 25 nanometers) and preferably from 100 to 200 nanometers.

It should be emphasized that these measurements are virtual measurements and that it would doubtless be more correct to refer to the width of the X-ray peak.

For this reason, the technique for measuring the crystallite size according to the Scherrer technique will be indicated subsequently.

It should also be emphasized that the positional zeros are not, except when expressly indicated, significant figures.

It is preferable for these aggregates to be topologically as close as possible to the soot, which is why it is desirable to introduce the aggregates into the combustion chamber or to manufacture in situ so that these aggregates can be formed simultaneously to serve as seeds for the soot. In order to be effective, it is advisable to add, or to form "in situ", cerium oxide in the form of aggregates specified above at a content of at least 10 ppm with respect to the carbonaceous fuel, preferably 20 ppm and more advantageously 50 ppm.

It is preferable that the cerium oxide thus formed has a particle size such that the $d_{80}$ (diameter of the mesh which allows 80% by mass of the product to pass) is at most equal to 10,000 Å (1000 nanometers) and preferably to 5000 Å (500 nanometers).

It is also preferable that the $d_{20}$ is greater than 200 Å (20 nanometers) and preferably 500 Å (50 nanometers).

The characteristics of the soot containing above aggregates can play a role in the present invention. It is therefore preferable that the particle size of the soot is such that the grain has a $d_{20}$ equal to at least 100 Å and/or a $d_{80}$ at most equal to 1000 Å and which contains at least 0.01%, advantageously at least 0.1% and preferably at least 0.5% of aggregate according to the present invention.

Advantageously, on average, the rare-earth metal(s) content (by mass of metal contained) in the soot reaches a level of between 1000 ppm and 30%, advantageously at least 5000 ppm and preferably at least 5% and advantageously at most 25% and preferably at most 10%.

In general, the soot grains form masses in which the $d_{50}$ is between 2000 and 5000 Å.

According to implementation of the present invention, the soot thus formed has a total cerium content between 1 and 5% by weight and preferably of 1.5 to 2.5%.

As was mentioned above, the crystallite aggregate is advantageously formed during the combustion of the motor fuel, or of the fuel, the latter being treated with at least one, preferably tetravalent, cerium compound in the solution or sol form.

It is also preferable that the $d_{20}$ is greater than 200 Å (20 nanometers) and preferably 500 Å (50 nanometers).

The factors which promote this low temperature combustion (or regeneration) are the oxygen content and the hydrocarbon compound content.

As regards the oxygen content (which has already been dealt with above), it is preferable that the oxygen content is at least equal to 3% and preferably to 5% approximately.

As regards the presence of hydrocarbon compounds in the exhaust gases, it is preferable that the volatility of the hydrocarbon compounds, their content in the gases and their temperature are such that, at a temperature where the soot is liable to be subjected to a combustion (for example is accumulated in the particle filter), the content (ratio by mass) of volatile hydrocarbon compounds in the soot is at least equal to one tenth, preferably a quarter and more advantageously a half of the mass, on a dry basis.

Volatiles is understood to mean all the hydrocarbon compounds, especially those which exist in the exhaust gases, which are in the gas form at 600° C., advantageously at 400° C. and preferably at 350° C.

It is desirable that these hydrocarbon compounds have a boiling point of between approximately 100° and 400° C.

This regeneration generally takes place when the content of hydrocarbon compounds in the gases is greater than or equal to 10 ppm and preferably greater than 20 ppm.

The best results are obtained with diesel oils in which 95% by mass of the constituents distil under atmospheric pressure at a temperature at least equal to 160° C. and advantageously to 180° C. and at which 95% by mass of the constituents are volatile under atmospheric pressure at 400° C. and preferably at 360° C.

The process gives better results with diesel oils containing a high aromatic content than with diesel oils containing a high aliphatic content, provided that the distillation constraints stated above are observed.

Most often, the compositions are rare-earth metal(s) compounds which are liquid under the conditions of use (especially ambiant temperature at the engine), in the form of sol(s) or dissolved, in hydrocarbon diluents, especially fuels, including diesel oils.

Thus, the present invention is particularly advantageous for two kinds of motor fuel. In the first, the aromatic content is very high [content of aromatic derivative(s) is at least equal to ⅕ and advantageously at least equal to ⅓], because it makes it possible to use these motor fuels which, without this invention, would lead to deposition which would be excessively problematic.

Moreover, it is on the motor fuels (that is to say the said mixtures) known as paraffinic, in which the paraffin content is at least equal to 30%, that the effects are the most marked. These motor fuels are studied for the purpose of responding to new, more constraining standards. It is desirable that, for this type of composition, the aromatic content (by mass) is at most equal to ⅕, advantageously to ⅒ and preferably to 1/20.

The invention is particularly well suited to the particles emitted by fast diesel engines (in contrast to the slow engines). These engines are basically used in ground transportation, such as heavy weights (lorries, coaches and the like), and light vehicles. Fast diesel engine is understood to mean engines in which the maximum power is reached at rotational speeds at least equal to 1500 revolutions/minute and advantageously at least equal to 1800 revolutions/minute.

A particularly advantageous implementation of the present invention consists of a process for filtering the gases of an internal combustion engine, which process consists in:
  introducing into the combustion chamber at least one derivative of rare-earth metals or of a mixture of rare-earth metals at a concentration of between 10 ppm and 500 ppm (by mass), preferably between 20 ppm and 200 ppm;
  collecting the soot produced by the internal combustion engine on a filter, the temperature of the gases entering into the filter being chosen within the range 100° C.–350° C. (the positional zeros are not significant figures); and
  leaving the soot to accumulate until a speed is reached where a significant fraction of the soot arriving is compensated for by the combustion of soot in the soot cake on the filter and providing for no regeneration as long as the pressure drop caused by the soot does not exceed a value chosen in advance and not exceeding 400 millibar.

The above pressure drop does not incorporate the pressure drop occasioned by the unladen soot filter, which pressure drop is in general less than 100 millibar and very often less than 50 millibar.

For reasons which are not entirely clear, metal filters give particularly good results or more precisely particularly frequent regenerations.

The filters give better results after 3 and preferably 5 regeneration cycles.

It could surprisingly be observed that there was, in general, no need to cause regenerations when the above conditions were respected.

Allogenous (or exogenous) regeneration is not as a general rule useful and must only be envisaged when it is desired to maintain a particularly low level of pressure drop (generally less than 200 or indeed 150 millibar).

It is then advisable, as allogenous regeneration, to envisage regenerations carried out by non-autogenous localized overheating (in order to bring the point to a temperature at least equal to 500° C. and advantageously to 600° C.) and not by overall overheating over the whole of the filter; this possibility is only advantageous because, according to the invention, localized overheating does not lead to overall and complete regeneration of the filter.

Localized overheatings can be carried out by any means known to those skilled in the art, such as microresistor(s) distributed over the surface of the filter, metal particles heated by eddy currents, miniarc or equivalent means.

The filtration mode according to the invention generally only operates during some of the speeds of an engine, because some of the speeds generate gases with a temperature at least equal to approximately 500° C. (two significant figures) which, ipso facto, produces progressive and often complete regeneration of the filter.

It should be noted that the temperature of the gases entering into the filter can vary widely within the temperature range 100°–400° C. These variations, which can be deliberately caused, promote the regeneration and make it possible to maintain a pressure drop which is low in value.

The position of the filter can advantageously be chosen so that the temperature of the filter is for the greatest possible portion of the time at a temperature within the above ranges.

As indicated above the preferred rare-earth metals are cerium, lanthanum and the mixtures containing cerium and lanthanum. The most common rare-earth metal content (metal content) of the motor fuel is between 50 and 150 ppm.

According to the present invention, it is possible to choose the rare-earth metals content of the motor fuel so as to adjust the pressure drop to a value chosen in advance. It is also possible to act on the filtering surface, while remaining within the above-specified temperature range.

This value chosen in advance is preferably between 100 and 400 millibar, preferably between 150 and 300 millibar.

In order to obtain such results, it is preferable that the rare-earth metals present in the soot have a concentration between 500 ppm and 10%, preferably between not less than 1000 ppm (mass of metal content with respect to the total mass of the soot, including the compounds which it has adsorbed) and not more than 5%, on average.

In the majority of currently marketed engines, it is advantageous to introduce the rare-earth metal, or the mixture of rare-earth metals, with its retinue of impurity(ies) and adjuvant(s), at a content of between 10 and 1000 ppm into the motor fuel. These values are expressed as metal content. Advantageously, contents of 20 to 200 ppm, preferably of 50 to 150 ppm, are used.

Some internal explosion engines, such as petrol engines and some diesel engines in the course of testing and development, produce or should produce less soot. Insofar as only the effect of regenerating the filter is being sought (and not a general improvement in the combustion), this makes it possible to reduce the amounts of rare-earth metal, or of mixture of rare-earth metals, to be introduced into the motor fuel, when this method of introduction has been favoured, and more generally into the combustion chamber. This reduction is carried out pro rata with respect to soot production in order to maintain the content of rare-earth metals, or the mixture of rare-earth metals, in the said soot.

It is advantageous that the form under which the rare-earth metal, or the mixture of rare-earth metals, is introduced leads to the formation of aggregates of crystallites of the rare-earth metal oxide, or of oxides of the mixture of rare-earth metals, where the largest size of the said aggregate is between 20 angstroms and 10,000 angstroms, preferably between 100 and 5000 angstroms, and for which the size of the crystallites is between 20 and 250 angstroms, preferably between 50 and 200 angstroms.

Introduction of the compounds based on rare-earth metals, alone or as a mixture, can be carried out especially by introduction of compounds based on rare-earth metals, alone or as a mixture, into the motor fuel intended to be introduced into the engine.

Another possibility consists in introducing the rare-earth metals, alone or as a mixture, in various forms via air, and especially air when it is mixed with exhaust gases of the engine, when a fraction of the exhaust gases is recycled in the engine. In this case, the compounds of the rare-earth metals, alone or in a mixture, incorporated in the recycled soot are introduced into the engine.

One of the most widely used means for introducing the rare-earth metal, alone or as a mixture, into the engine circuit consists in introducing it into the motor fuel either in the salt form or in the sol form. These salt or sol compounds advantageously contain products which are harmless for combustion and for the environment.

Thus, it is preferable that the salts or the sols are prepared from hydrocarbon compounds such as the salts of carbonaceous acids, whether they are of the carboxylic acid type or of the mobile hydrogen compound type such as, for example, acetylacetonates.

It is also possible to envisage compounds of acid type based on sulphur such as sulphuric acids (alkyl or aryl acid sulphates) or else acids of sulphonic type. However, the latter acids have the disadvantage of increasing the sulphur content of the motor fuel.

Generally, for rare-earth metals having a valency of III as the highest valency, the salts of $C_2$ to $C_{20}$, preferably from $C_4$ to $C_{15}$, carboxylic acid are among the best suited to this use.

For cerium, the derivatives of cerium(IV) are preferred due to their stability and their ability to produce few particles.

It is preferable that the rare-earth metal oxides or mixtures of rare-earth metal oxides are stable in the motor fuel. Cerium is the preferred rare-earth metal, alone or in combination. Cerium can be introduced into the motor fuels either in the form of sols or in the form of various salts, provided that the latter are sufficiently stable in the medium. Mention may especially be made of the salts which are the subject of the European patent application filed under the number 93/304760.7 and published under the number 057 5189.

In fact, in an entirely surprising way, it could be observed that, when additives based on transition metals (that is to say metals in which one of the d subshells is in the course of filling) were used, low-temperature regenerations were either nonexistent or else gave rise to violent ignitions leading to high temperatures capable of damaging the filters.

In contrast, in the case of components to which derivatives based on rare-earth metals have been added, a state is fairly rapidly reached, after an accumulation phase in the filter, in which the amount of soot arriving on the filter is compensated for by many random, but not violent, combustions which have taken place in the body of the soot accumulated on the filter.

The result is thermal effects which are not very pronounced as well as pressure drop variations which are much smaller.

Thus, it was possible to show that the use of additives based on rare-earth metal elements leads to a two-fold advantage:

in the first place, the limitation in the thermal deviations (due to the regeneration of the filter) makes it possible for the filtering material to retain all its properties and especially its filtration efficiency; the system has a longer lasting and better efficiency;

in the second place, the behavior in the presence of additives based on rare-earth metal elements makes it possible for the pressure drop phenomena to be more flexibly managed; in fact, in the case of additives based on transition-metal elements (especially on copper and iron), the regenerations are random, fierce and violent, the pressure drops changing very abruptly. This leads to variations in the power of the engine and harms the safety and comfort of driving as well as the satisfactory operation of the engine; on the other hand, in the case of additives based on rare-earth metal elements, the regenerations are low in magnitude, which reduces the effects on the pressure drop and the thermal effects. The pressure drop due to the filter stabilizes and can be managed without penalizing the safety and agreeableness of driving.

According to one of the preferred embodiments of the present invention, it is possible to use lanthanum derivatives for implementing the present invention. This has led to the development of lanthanum derivatives as well as of other doped rare-earth metals.

The invention provides a process for reducing the emission of soot from an internal combustion engine, in which the exhaust gases are made to pass through a particle filter and in which an additive containing lanthanum is introduced into the combustion chambers.

According to one of the embodiments of the present invention, lanthanum is added to the motor fuel in the form of a salt or of a stable sol.

The use of rare-earth metals as combustion adjuvants has been described for a long time in the state of the prior art but lanthanum has only ever been mentioned incidentally, or rather accidentally, as a member of this family.

More recently, in an exhaustive study carried out at the Institut Français du Petrole on various rare-earth metals and on their ability to catalyse the oxidation of soot, M. Desoete has shown that lanthanum had no catalysis property on carbonaceous particles.

This article, published in English and entitled "Catalysis of soot combustion by metal oxides", dated February 1988 and published under reference 35991 (available on public request), clearly shows, in FIG. 10, the absence of an effect by lanthanum oxide.

In an entirely surprising way, the soot formed by the introduction of lanthanum-based compounds into the circuits of the internal combustion engines, and especially diesel engines, has the property of being significantly easier to ignite, that is to say having a lower ignition temperature, than the soot prepared without additives.

Introduction of the lanthanum-based compounds can be carried out especially by introduction of lanthanum-based compounds into the motor fuel intended to be introduced into the engine.

Another possibility consists in introducing lanthanum in various forms via air, and especially air when it is mixed with exhaust gases of the engine, when a fraction of the exhaust gases is recycled in the engine. In this case, the lanthanum compounds incorporated in the recycled soot are introduced into the engine.

One of the most widely-used means for introducing lanthanum into the engine circuit consists in introducing it into the motor fuel either in the salt form or in the sol form. These salt or sol compounds advantageously contain products which are harmless for combustion or for the environment.

Thus, it is preferable that the salts or the sols are prepared from hydrocarbon compounds such as the salts of carbonaceous acids, whether they are of the carboxylic acid type or of the mobile hydrogen compound type such as, for example, acetylacetonates.

It is also possible to envisage compounds of acid type based on sulphur such as sulphuric acids (alkyl or aryl acid sulphates) or else acids of sulphonic type. However, the latter acids have the disadvantage of increasing the sulphur content of the motor fuel.

Generally, the salts of $C_2$ to $C_{20}$, preferably of $C_4$ to $C_{15}$, carboxylic acid are among the best suited to this use.

In order to obtain good catalysis of the combustion of the soot, it is advisable to provide for a satisfactory concentration of lanthanum and of its optional potentiation adjuvants in the soot; this concentration is advantageously between 500 ppm and 10%, preferably between at least 1000 ppm (mass of metal content with respect to the total mass of the soot, including the compounds which it has adsorbed) and at most 5%, on average.

In the majority of currently marketed engines, it is advantageous to introduce lanthanum, with its retinue of impurity (ies) and adjuvant(s), at a content of between 10 and 1000 ppm into the motor fuel. These values are expressed as metal content. Advantageously, contents of 20 to 200 ppm, preferably of 50 to 150 ppm, are used.

Some internal explosion engines, such as petrol engines and some diesel engines in the course of testing and development, produce or should produce less soot. Insofar as only the effect of regenerating the filter is being sought (and not a general improvement in combustion), this makes it possible to reduce the amounts of lanthanum to be introduced into the motor fuel, when this method of introduction has been favoured, and more generally into the combustion chamber. This reduction is carried out pro rata with respect to soot production in order to maintain the lanthanum content in the said soot.

It is advantageous that the form under which lanthanum is introduced leads to the formation of aggregates of crystallites of lanthanum oxide where the largest size of the said aggregate is between 20 angstroms and 10,000 angstroms (2 and 1000 nm), preferably between 100 and 5000 angstroms (10 and 500 nm), and for which the size of the crystallites is between 20 and 250 angstroms (2 and 25 nm) and preferably between 50 and 200 angstroms (5 and 20 nm).

According to the present invention, it has also been shown that lanthanum was an element capable of potentiating, or of being potentiated by, other elements especially capable of catalysing oxidations of carbonaceous products and those leading to defects in the crystalline lattice of lanthanum oxide.

It has thus been shown that transition elements, that is to say metals in which one of the d subshells is in the course of filling, gave marked synergic effects with lanthanum. This synergic effect is also demonstrated with other elements containing f shells in the course of filling, and especially with the other rare-earth metals, including yttrium.

The most marked results are those of lanthanum in combination with manganese, copper, cobalt and/or iron. Other rare-earth metals, including yttrium, alone or as a mixture, also have a specific advantage.

The lanthanum content, with respect to the sum of the metal elements contained in the adjuvant, is generally between 5% and 95%. Advantageously, it is at least equal to 50% and preferably to 80%.

The elements which potentiate, or are potentiated by, lanthanum are introduced in the same way as this element can be introduced.

As was mentioned above, another aim of the present invention is to provide a process which makes possible a regeneration of the particle filters which can be described as low temperature.

This aim is achieved by means of a process using the lanthanum-based compounds mentioned above.

This process consists in:

introducing a lanthanum derivative as specified above into the motor fuel at a concentration of between 10 ppm and 500 ppm (by mass) and preferably between 20 ppm and 200 ppm (as metal content);

collecting the soot produced by the internal combustion engine on a filter, the temperature of the gases entering into the filter being chosen within the range 100°–400°C. (in the present description, the positional zeros are not significant figures, except when this is specified), and leaving the soot to accumulate until a speed is reached where a significant fraction of the soot arriving is compensated for by the combustion of soot in the soot cake on the filter and providing for no imposed regeneration as long as the pressure drop caused by the soot does not exceed a value chosen in advance and advantageously not exceeding 500 millibars.

Indeed, according to the present invention, it was possible to show that it was possible to have regenerations at temperatures as low as approximately 100° C. During a European engine cycle, it is possible to have violent temperature variations in exhaust gases which can, without reaching the above maximum value (that is to say, the minimum temperature which is fatal to the filter(s)), make it possible to obtain partial or complete regeneration.

The following non-limiting examples illustrate the invention.

EXAMPLES

A— Description of the experimental conditions

The engine used is a four-cylinder, indirect injection, atmospheric diesel engine with a cubic capacity of 1.696 liters and developing 50 kilowatts at 4400 revolutions per minute. This engine is sold under the trade name Volkswagen.

The filters used are cordierite filters produced by the Company Corning, of the EX 4-7 type (5.66 inches in diameter, 6 inches long, with a cell density of 100 cpi/17 mil). Each additive was tested on a fresh filter. The following are measured continuously during the tests:

the pressure drop related to the filter (pressure drop between the inlet and outlet of the filter);

the temperature of the gases at the inlet of the filter;

the temperature of the gases at the outlet of the filter;

the carbon monoxide emissions.

The tests are carried out at 2000 revolutions/minute while maintaining the temperature of the gas at the inlet of the filter constant with time. The tests carried out at a temperature of 250 ° C. are reported below but similar results were obtained at other temperatures.

The tests were carried out with especially:

an iron-based additive whose content in the fuel oil is 20 ppm (mass);

a copper-based additive; the copper level in the fuel oil is 20 ppm;

two additives based on cerium and rare-earth metals; the content of rare-earth metal elements (cerium) in the fuel oil is 50 ppm.

Taking into account the respective molar masses of the elements, the molar, or more exactly atomic, contents are substantially of the same order for all the additives, namely:

iron: 0.36 mol/1000 kg of fuel oil;

copper: 0.32 mol/1000 kg of fuel oil;

cerium: 0.36 mol/1000 kg of fuel oil.

B— Results

Example No. 1 the case of the iron-based additive

The results are reported in FIG. 1. This figure gives, on the one hand, a change in the pressure drop as a function of time and, on the other hand, the carbon monoxide content in the gas at the filter outlet as well as the change in the temperature of the gas at the filter outlet as a function of time. It is observed that the periods of accumulation can reach a duration of 35,000 seconds. The pressure drop easily reaches 300 millibar. During the regenerations which correspond to the violent reduction in the back pressure, a strong increase in the carbon monoxide content of the gases at the filter outlet is observed. Simultaneously with these variations in carbon monoxide content, a very abrupt increase in the temperature of the gases at the filter outlet is observed, with temperatures which can reach 700° C. or indeed 800° C., whereas the temperature of the gases at the inlet of the filter is only 250° C. The variation in the back pressure is very violent. It is possible to lose 250 millibar very quickly during these regeneration phases and the duration of the accumulation regions, as with the magnitude of the back pressure variations, seems to vary randomly. These graphs demonstrate the random and violent behavior of the regenerations, which allows it to be supposed that the engine will be doubtless affected by these abrupt downstream back pressure variations.

In this example, the iron-based additive is ferrocene.

Example No. 2 the case of the copper-based additive

The copper used is a cupric carboxylate. The results are reported in FIG. 2. This figure gives, on the one hand, the change in the back pressure as a function of time and, on the other hand, the carbon monoxide content in the gas at the filter outlet and the change in the temperature of the gas at the filter outlet, as a function of time.

It is observed that the periods of accumulation can reach 54,000 seconds, i.e. nearly 20 hours. A pressure drop, or back pressure, which can reach 350 millibar is observed. During the regenerations which correspond to the abrupt reduction in the pressure drop, a strong increase in the carbon monoxide content in the gases at the filter outlet is observed. In parallel with these variations in the carbon monoxide content, a very abrupt increase in the temperature of the gases at the filter outlet is observed, with temperatures which can reach more than 800° C., whereas the temperature of the gases at the filter inlet is only 250° C. The variation in the back pressure is very violent. It is possible to lose 300 millibar very quickly during these regeneration phases. The duration of the accumulation regions, as with the magnitude of the variations in back pressure, seems to vary randomly. These graphs demonstrate the random and violent behavior of these regenerations, which allows it to be supposed that the engine will be affected by these abrupt downstream back pressure variations.

Example No. 3 the case of a cerium-based additive (compound described in the European patent application filed under the number 93/304760.7 and published under the number 057 5189)

The results are reported in FIG. 3. This figure gives, on the one hand, the change in the back pressure as a function of time and, on the other hand, the CO content in the gas at the filter outlet and the change in the temperature of the gas at the filter outlet as a function of time. A period of charging the filter of 25,000 seconds is observed. Beyond this point it is observed that the back pressure is virtually stable. This back pressure stabilizes in the region of 200 millibar. At the time of the regenerations which correspond to very low decreases in the back pressure (less than 50 millibar), variations in the carbon monoxide content in the gases at the filter outlet are observed. These variations testify to a constant regeneration activity with time. Parallel to these variations in the carbon monoxide content, a moderate increase in the temperature of the gases at the filter outlet is observed, with temperatures which can reach not more than 400° C., for a temperature of the gases at the filter inlet of 250° C. These graphs demonstrate the behavior, which is both moderate and permanent, of the regenerations, which allows it to be supposed that the engine and thus the agreeableness of driving is not thereby detrimentally affected.

Example No. 4 example of an additive based on a cerium sol

These results are reported in FIG. 4. This figure gives, on the one hand, a change in the back pressure as a function of time and, on the other hand, the carbon monoxide content in the gas at the filter outlet and the change in the temperature of the gas at the filter outlet as a function of time. A period of charging the filter of 45,000 seconds is observed. Beyond this time, it is observed that the back pressure is virtually stable. This back pressure stabilizes in the region of 200 millibar. At the time of the regenerations which correspond to very small decreases in the back pressure (less than 50 millibar), variations in the carbon monoxide content in the gases at the filter outlet are observed. These variations testify to a constant regeneration activity with time. In parallel with these variations in the carbon monoxide content, a moderate increase in the temperature of the gases at the filter outlet is observed, with temperatures which can reach not more than 350° C., for a temperature of the gases at the filter inlet of 250° C. These graphs demonstrate the behavior, which is both moderate and permanent, of the regenerations, which allows it to be thought that the engine, the safety and the agreeableness of driving are not thereby detrimentally affected in any way. The number of fine particles formed is significantly less than that in the preceding examples.

Example No. 5 tests on a constant-speed engine bed

Tests were carried out on a new engine of F8Q 706 type with a capacity of 1870 $cm^3$ and the particle filter used is an Eberspacher particle filter number 2626000415. This filter is equipped with two thermocouples, one upstream and the other downstream. The tests were carried out on particle filters which have been subjected to a number of chargings and a number of regenerations. In fact, the first effects are relatively erratic.

For each additive: a fresh particle filter (PF) is used.

The particle filter must be initially stabilized, that is to say that it must be subjected to a minimum of 3, fouling and regeneration, cycles.

Fouling at the 1500 rev/min ¾ load position, charging of the particle filter with 70 g of soot;

Regeneration at the 4000 rev/mim position, exhaust temperature: 600° C.

The following law is found for each particle filter, during the stabilization phase in the process of fouling, and for the fouling position: mass of soot deposited: f(ΔP PF) (the relationship is constructed by successively removing and weighing the filter element).

The self-regeneration test is carried out as follows:

Starting conditions:

The particle filter is fouled with 70 g of soot,

Before the test, the particle filter is cold (ambient temperature).

The tests below are tests on stabilized particle filters (PF).

The tests are carried out at constant speed, the speed being expressed by number of revolutions to the minute.

The results obtained, either without additive or with an additive based on various rare-earth metal salts introduced into the motor fuel in a proportion, except if otherwise indicated, of 100 ppm of metal content, are collated in the following tables.

The filters are charged beforehand with particles under conditions where they accumulate even in the presence of rare-earth metals. These conditions are:

1500 revolutions/minute;

¾ of the full load;

richness of the mixture: between 0.8 and 0.9 oxygen content of the gases: between 2 and 4%;

the particle filters are charged with 70 g of soot per filter.

Characterization of the self-regeneration ability of soot with an additive-containing diesel oil on an F80 706 engine The test lasts approximately 130 minutes (8000 seconds). It could be observed that, when regeneration took place, the total pressure was maintained at a value of less than approximately 200 millibar during the remainder of the test. The pressure drop related to the filter alone is of the order of 50 to 100 millibar.

Constant speed

The self-regeneration tests are carried out at three constant speeds in the order: 2500, 1500 and 4000 rev/min.

The engine is switched on and adjusted to the operating position (Example: 2500 rev/min, MEP (Mean Effective Pressure) 0 bar, while waiting for the engine to warm up, after 10 minutes, beginning the acquisition of the first position. The test takes place by increasing the load every ten minutes according to predefined stationary stages (MEP: 0, 1, 2, 3, 4, 4.5, 5, 5.5, 6.5, 7 and 7.5 bar).

The mean effective pressure (MEP) is given from the torque by the relationship MEP= (40×π×torque)/cubic capacity.

Once the particle filter is charged, the engine is set at a certain speed and, as specified above, the load is progressively increased by stationary stages of 10 minutes (increment of the order of 9 N.m per stationary stage) until the value of the order of 100 N.m is reached. Once regeneration is obtained, the values of the different variables just before triggering are determined.

No-load test

The engine is run under no load at the desired speed.

TABLE 1

Tests without additive

| SPEED | Exh. T. | T. upstream PF | MEP | dp PF | $O_2$ | HC | | CO | | with or without |
|---|---|---|---|---|---|---|---|---|---|---|
| rev/min | °C. | °C. | bar | mbar | % | ppm | g/h | ppm | g/h | additive |
| 1500 | | 503 | 4.15 | 769 | — | — | — | — | — | without |
| 2500 | 432 | 382 | 4.15 | 853 | 9.2 | | | | | without |
| 4000 | 451 | 419 | 1.55 | 1154 | 11.2 | | | | | without |

TABLE 2

NO-LOAD TEST
with 150 ppm (metal content) of cerium salt (cerous octoate)

| SPEED | Exh. T. | T. upstream PF | MEP | dp PF | $O_2$ | HC | | CO | | with or without |
|---|---|---|---|---|---|---|---|---|---|---|
| rev/min | °C. | °C. | bar | mbar | % | ppm | g/h | ppm | g/h | additive |
| 800 | 98 | 79 | 0 | 240 | 17.50 | 138 | 2.8 | 300 | 12.3 | with |
| 1000 | 104 | 87* | 0 | 258 | 17.45 | 62 | 1.5 | 230 | 11.5 | with |
| 1500 | 126 | 114* | 0 | 360 | 17.70 | 38 | 1.60 | 250 | 21.70 | with |
| 1500 | 125 | 119* | 0 | 426 | 17.55 | 27 | 1.1 | 240 | 1.2 | with |
| 2500 | 239 | 227* | 0 | 1156 | 15.55 | 58 | 3.8 | 320 | 42.6 | with |
| 4000 | 362 | 336* | 0 | 1133 | 13.45 | 46 | 4.6 | 220 | 44.7 | with |

Results on lanthanum

The results obtained with an additive based on lanthanum octoate introduced into the motor fuel in portion of 100 ppm of lanthanum are collated in the following tables:

TABLE 3

TESTS CARRIED OUT AT CONSTANT SPEED WITH LANTHANUM SALT

| SPEED | Exh. T. | T. upstream PF | MEP | dp PF | $O_2$ | HC | | CO | | with or without |
|---|---|---|---|---|---|---|---|---|---|---|
| rev/min | °C. | °C. | bar | mbar | % | ppm | g/h | ppm | g/h | additive |
| 1500 | 460 | 388 | 6.4 | 705 | 5 | 10 | 0.4 | 150 | 12 | with |
| | | | | no regeneration | | | | | | |
| 1500 d | 295 | 241* | 2.5 | 663 | 13.5 | 46 | 1.9 | 160 | 13.4 | with |
| a 2500 | 371 | 331* | 3.5 | 821 | 10.8 | 29 | 1.9 | 140 | 18.3 | with |
| b 2500 | 285 | 251* | 2.2 | 943 | 13.8 | 32 | 2.2 | 170 | 23.1 | with |
| 4000 | 431 | 393* | 1.6 | 1060 | 10.9 | 8 | 0.8 | 220 | 46.8 | with |

TABLE 4

NO-LOAD TESTS WITH LANTHANUM SALT

| SPEED | Exh. T. | T. upstream PF | MEP | dp PF | $O_2$ | HC | | CO | | with or without |
|---|---|---|---|---|---|---|---|---|---|---|
| rev/min | °C. | °C. | bar | mbar | % | ppm | g/h | ppm | g/h | additive |
| 1500 | 498 | 124 | 0 | 705 | 17.5 | 46 | 2.00 | 265 | 23.00 | with |
| 1500 Al = 0 | 189 | 161 | 0 | 892 | 16.8 | 410 | 16.8 | 660 | 54.8 | with |
| | | | | no regeneration | | | | | | |
| 1500 | 170 | 145* | 0 | 1020 | 17 | 82 | 3.5 | 240 | 20.5 | with |

*spontaneous regeneration

TESTS ON ARTIFICIAL SOOT
Method for producing the soot

The soot is obtained by pyrolysis of fuel oil containing the additive. A gas flow consisting of a 98/2 (by volume) mixture of nitrogen and oxygen is passed through a tube known as a "reactor tube". The reactor tube is heated by virtue of an oven and the gas flow is thus brought to 1200° C. The fuel oil, with or without additive, is sprayed very finely upstream of the oven. The fuel oil droplets are transported by the gas flow and are also brought to 1220° C.

Under these conditions, the fuel oil partially burns and forms soot. The soot is then collected downstream of the pyrolysis oven by filtering the gas flow. If the fuel oil contains a metal additive, the metal is found in the oxide form, intimately mixed with the soot. The flow rate of injection of the fuel oil upstream of the pyrolysis oven is adjusted to 10 ml/h.

Under these conditions, the mean diameter of the elemental particles of the soot produced by pyrolysis is identical to that of the soot produced by a diesel engine.

According to studies carried out by the Applicant company, the metal additives are used at a concentration in the engine diesel oil such that the concentration of metal in the diesel oil is between 0 and 200 ppm. Under these conditions, the concentrations of metal in the soot produced by an engine fed with an additive-containing diesel oil is between 0 and 4%.

As the final concentration of catalyst in the soot is one of the important parameters which condition the ignition temperature, it was necessary to search for that concentration of metal in the fuel oil which it was advisable to have in order to obtain the same concentration of metal in the soot obtained by pyrolysis.

It was shown that it is necessary for the concentration of metal in the fuel oil to be multiplied by 20 with respect to the concentration of additive in the engine diesel oil. The range is thus of the order of 0 to 4000 ppm by mass.

in conclusion, for the soot obtained by pyrolysis to be representative of the engine soot, the concentration of additive in the fuel oil must be multiplied by 20.

Studies of the soot by Thermogravimetric analysis or TGA

The soot produced by the pyrolysis oven can be recovered in TGA.

The conditions are the following:

| Equipment | Setaram: TG92 model |
|---|---|
| Gas flow rate | 2.3 l/h |
| Gas | air |
| Temperature | increasing from 20 to 900° C. at the rate of 10° C./min |
| Mass of soot analysed | 20 mg |

TGA records the mass of soot remaining as a function of time. By convention, the ignition temperature is defined by us as the abscissa of the point defined as the intersection of the base line to the origin with the tangent to the curve at a point where the rate of combustion is maximum (that is to say, at the point of inflection of the so-called "S" curve).

Study of the reactivity of the soot obtained by pyrolysis of diesel oils containing additives composed of lanthanum, copper and cobalt Copper and cobalt are two metals which are known for their ability to lower the ignition temperature, are reputed to be toxic and induce thermal shocks which are dangerous for the filter. One of the subjects of the present study was to show the synergy which exists between a metal such as copper or cobalt with respect to lanthanum.

The soot samples were all produced by the method described above and their tendency towards combustion was measured by TGA. The concentrations of metal in the fuel oil are certainly very high but they give information on an implementation on an engine bed with concentrations in the diesel oil used as motor fuel corresponding to approximately 1/20th of the concentrations in the fuel oil.

Additives used

The names of the additives used for this study, and their characteristics, are combined in Table 1:

TABLE 5

Characteristic of the additives used

| Name of the additive | Concentration of the metal in the additive as % |
|---|---|
| Copper Cekanoate | 9.2 |
| Cobalt octoate | 10 |
| Lanthanum octoate | 10.23 |

The ignition temperature of the soot is given in the tables below as a function of the concentration of metal in the fuel oil.

TABLE 6

Ignition temperature as a function of the concentration of metal acting alone in the fuel oil (comparative examples)

| | CONCENTRATION OF METALS IN THE FUEL OIL (mmol/kg) | | | TEMPERATURE (in °C.) | |
|---|---|---|---|---|---|
| TEST No. | Lanthanum | Adjuvant of the lanthanum | Total conc. | Of ignition | Lowering |
| 1 | | 0 | | 490 | 0 |
| 2 | | Copper: 3.04 | 3.04 | 470 | −20 |
| 3 | | Copper: 7.14 | 7.14 | 375 | −115 |
| 4 | | Copper: 10.7 | 10.7 | 370 | −120 |
| 5 | | Copper: 14.2 | 14.2 | 360 | −130 |
| 6 | | Copper: 17.8 | 17.8 | 360 | −130 |
| 7 | | Copper: 26.8 | 26.8 | 355 | −135 |
| 8 | | Copper: 28.5 | 28.5 | 355 | −135 |
| 9 | | Cobalt: 3.56 | 3.56 | 435 | −55 |
| 10 | | Cobalt: 7.12 | 7.12 | 375 | −115 |
| 11 | | Cobalt: 10.7 | 10.7 | 355 | −135 |
| 12 | | Cobalt: 14.3 | 14.3 | 365 | −125 |
| 13 | | Cobalt: 17.8 | 17.8 | 335 | −155 |

TABLE 7

Ignition temperature as a function of the concentration of lanthanum acting alone in the fuel oil

| | CONCENTRATION OF METALS IN THE FUEL OIL (mmol/kg) | | | TEMPERATURE (in °C.) | |
|---|---|---|---|---|---|
| TEST No. | Lanthanum | Adjuvant of the lanthanum | Total concentration | Of ignition | Lowering |
| 14 | 14.3 | 0 | 14.3 | 410 | −80 |
| 15 | 38.9 | 0 | 38.9 | 400 | −90 |

TABLE 8

Ignition temperature as a function of the composition of the adjuvants in the fuel oil

| | CONCENTRATION OF METALS IN THE FUEL OIL (mmol/kg) | | | TEMPERATURE (in °C.) | |
|---|---|---|---|---|---|
| TEST No. | Lanthanum | Adjuvant of the lanthanum | Total conc. | Of ignition | Lowering |
| 16 | 7.14 | Copper: 3.56 | 10.7 | 380 | −110 |
| 17 | 7.14 | Copper: 7.14 | 14.3 | 375 | −115 |
| 18 | 7.14 | Copper: 10.7 | 17.8 | 370 | −120 |
| 19 | 10.7 | Copper: 3.56 | 14.3 | 400 | −90 |
| 20 | 8.53 | Copper: 7.14 | 15.7 | 360 | −130 |
| 21 | 14.3 | Copper: 3.56 | 17.8 | 380 | −110 |
| 22 | 9.03 | Copper: 8.83 | 17.8 | 370 | −120 |
| 23 | 5.40 | Copper: 5.28 | 10.7 | 405 | −85 |
| 24 | 9.00 | Copper: 26.8 | 35.8 | 340 | −150 |
| 25 | 13.44 | Cobalt: 12.18 | 25.62 | 360 | −130 |
| 26 | 5.62 | Cobalt: 5.09 | 10.71 | 377 | −113 |
| 27 | 4.70 | Cobalt: 6.11 | 10.81 | 360 | −130 |
| 28 | 7.14 | Cobalt: 3.56 | 10.70 | 395 | −95 |
| 29 | 7.14 | Cobalt: 7.14 | 14.28 | 365 | −125 |
| 30 | 7.14 | Cobalt: 10.71 | 17.85 | 355 | −135 |
| 31 | 10.75 | Cobalt: 3.56 | 14.31 | 350 | −140 |
| 32 | 10.75 | Cobalt: 7.14 | 17.89 | 360 | −130 |
| 33 | 14.28 | Cobalt: 3.56 | 17.84 | 375 | −115 |

We claim:

1. Process for the treatment of soot produced by an internal combustion engine, containing one or more rare-earth metals wherein said process comprises:
   introducing into a combustion chamber of said combustion engine at least one derivative of a rare-earth metal or of a mixture of rare-earth metals at a concentration of between 10 ppm and 500 ppm, by mass;
   collecting soot produced by the internal combustion engine on a filter;
   contacting said soot with a gas containing oxygen, wherein said gas has a temperature of between 100° C. and 350° C. and the oxygen partial pressure of said gas containing oxygen is at least equal to 0.03 atmospheres; and
   allowing the soot to accumulate until a speed is reached where a significant fraction of the soot arriving is compensated for by the combustion of soot in the soot cake on the filter and providing for no regeneration as long as the pressure drop caused by the soot does not exceed a predetermined value not exceeding 0.5 bar.

2. Process according to claim 1, characterized in that the contact between the gas containing oxygen and the soot is maintained for a time interval which is sufficient to burn at least 90% of the soot.

3. Process according to claim 1, wherein at least a part of the said gas containing oxygen arises from air heated in contact with a part of the engine.

4. Process according to claim 1, wherein the gas containing oxygen at least partially contains the exhaust gases of the engine.

5. Process according to claim 1, wherein said engine is a diesel engine.

6. Process according to claim 1, wherein the engine is equipped with a turbocharger.

7. Process according to claim 1, wherein the rare-earth metals are present in the soot at a level of between 500 ppm and 5%.

8. Process according to claim 1, wherein the particles contained in the filter are intermittently subjected to the conditions of the present process.

9. Process according to claim 3, wherein said rare-earth metal is introduced into the engine via air.

10. Process according to claim 3, wherein said rare-earth metal is introduced into the engine via the motor fuel.

11. Process according to claim 10, wherein the rare-earth metals content of said motor fuel is between 50 and 150 ppm.

12. Process according to claim 1, wherein the temperature at which the gases are filtered is between 200 ° and 350° C.

13. Process according to claim 1, wherein said rare-earth metal is cerium or a cerium compound.

14. Process according to claim 1, wherein the surface area of the filter is selected so as to maintain the pressure drop in said filter at a value at most equal to 0.3 bar.

15. Process according to claim 1, wherein the temperature of the gases in contact with the filter is selected so as to maintain the pressure drop in said filter at a value at most equal to 0.3 bar and advantageously to 0.2 bar.

16. Process according to claim 1, wherein the content of rare-earth metals in the motor fuel is selected so as to maintain the pressure drop in said filter at a value at most equal to 0.3 bar.

17. Process according to claim 1, wherein said rare earth metal contains lanthanum.

18. Process according to claim 17, wherein said lanthanum is added to the motor fuel in the form of a salt which is stable in said motor fuel.

19. Process according to claim 17, wherein the compound containing lanthanum is directly introduced into the engine.

20. Process according to claim 17, wherein the lanthanum content of the motor fuel is between 10 and 1000 ppm.

21. Process according to claim 1, wherein the sol and/or the salt are introduced so as to form crystallite aggregates in which the largest size is between 20 and 10,000 angstroms (2 and 1000 nm) and in which the size of the crystallites is between 20 and 250 angstroms (2 and 25 nm).

22. Process according to claim 17, wherein said lanthanum is introduced into the engine via air.

23. Process according to claim 17, wherein said lanthanum is added to the motor fuel in the form of a sol which is stable in said motor fuel.

24. Process according to claim 1, wherein the rare-earth metal or mixture of rare-earth metals is present at a concentration effective to provide a back pressure of from 100 to 400 millibar.

25. Process according to claim 1, wherein the rare-earth metal or mixture of rare-earth metals is cerium and lanthanum alone or in combination with other rare earth metals.

* * * * *